(12) United States Patent
Thodupunoori et al.

(10) Patent No.: US 8,965,362 B1
(45) Date of Patent: Feb. 24, 2015

(54) METHODS AND APPARATUS FOR PREFIX FILTERING OF INTERNATIONAL MOBILE SUBSCRIBER IDENTITY (IMSI) WILDCARD APPLICATION

(75) Inventors: Santhosh Kumar Thodupunoori, San Jose, CA (US); Senthil Raja Velu, Sunnyvale, CA (US); Sridharan Muthuswamy, Cupertino, CA (US)

(73) Assignee: WiChorus, Naperville, IL (US)

( * ) Notice: Subject to any disclaimer, the term of this patent is extended or adjusted under 35 U.S.C. 154(b) by 693 days.

(21) Appl. No.: 13/301,578

(22) Filed: Nov. 21, 2011

(51) Int. Cl.
*H04W 92/02* (2009.01)
(52) U.S. Cl.
USPC .......... 455/432.2; 455/432.1; 455/434; 455/435.2; 455/436; 455/552.1; 370/252; 370/329; 370/331; 370/335; 370/389
(58) Field of Classification Search
CPC .... H04B 1/3816; H04W 8/205; H04W 8/245; H04W 8/10; H04W 8/12; H04W 48/16; H04W 48/18; H04W 64/00; H04W 36/30
USPC ............... 455/432.1, 452, 435.2, 432.2, 434, 455/456.1, 433, 564, 552.1; 370/335, 338, 370/331, 319, 238, 252, 389, 412
See application file for complete search history.

(56) References Cited

U.S. PATENT DOCUMENTS

| | | | | |
|---|---|---|---|---|
| 6,317,597 | B1 * | 11/2001 | Baker et al. | 455/426.1 |
| 7,065,578 | B2 * | 6/2006 | Garrett et al. | 709/229 |
| 8,170,551 | B2 * | 5/2012 | Rahman et al. | 455/432.3 |
| 8,792,476 | B2 * | 7/2014 | Tu et al. | 370/352 |
| 2003/0100334 | A1 * | 5/2003 | Mazzara, Jr. | 455/552 |
| 2004/0236849 | A1 * | 11/2004 | Cooper et al. | 709/224 |
| 2005/0107104 | A1 * | 5/2005 | Rajkotia | 455/502 |
| 2006/0160532 | A1 * | 7/2006 | Buckley et al. | 455/422.1 |
| 2006/0223528 | A1 * | 10/2006 | Smith | 455/432.3 |
| 2010/0099406 | A1 * | 4/2010 | Anantharaman et al. | 455/434 |
| 2012/0100836 | A1 * | 4/2012 | Yang | 455/414.1 |

* cited by examiner

*Primary Examiner* — Addy Anthony
*Assistant Examiner* — Babar Sarwar
(74) *Attorney, Agent, or Firm* — James M. Wu; JW Law Group

(57) ABSTRACT

A method and apparatus for network accessing configured to prefix filtering one or more wildcard identity for an International Mobile Subscriber Identity ("IMSI") application is disclosed. Upon receiving a request of a new rule with system identification ("SID") for network access, a process of wildcard prefixing is able to identify a wildcard in a predefined field of the SID. The SID, in one example, is an IMSI. After retrieving a specific prefix in accordance with the wildcard, the wildcard is replaced with the specific prefix in the predefined field of the SID to form a modified rule. The predefined field of the SID can be a field for mobile country code ("MCC"), mobile network code ("MNC"), or mobile subscriber identification number ("MSIN"). The process subsequently inserts the modified rule into a memory structure.

17 Claims, 6 Drawing Sheets

METHODS AND APPARATUS FOR PREFIX FILTERING OF INTERNATIONAL MOBILE SUBSCRIBER IDENTITY (IMSI) WILDCARD APPLICATION

FIELD

The exemplary embodiment(s) of the present invention relates to communications network. More specifically, the exemplary embodiment(s) of the present invention relates to network accessing.

BACKGROUND

With rapid growth of mobile data transfer over a high-speed communication network such as 3G or 4G cellular services, authenticating, managing, and controlling such data transfer become increasingly difficult and complicated. A conventional network layout includes Internet, LAN (local area network), and wireless networks having hundreds of network devices such as access switches, routers, and bridges for facilitating data delivery from source devices to destination devices. Authenticating and transferring massive amount of data efficiently between wireless portable devices such as smart phones and laptops over a typical and/or standard network becomes increasingly challenging.

In a wireless mobile network environment, a conventional mobile device uses information stored in a subscriber identity module ("SIM") card such as International Mobile Subscriber Identity ("IMSI") to authenticate and/or access wireless networks as well as wired networks for transporting information. To establish a link(s) for information and/or packets transfer between a mobile device and its destination(s) via a core network such as general packet radio service ("GPRS") core network, the mobile device is typically authenticated using IMSI information before a link can be established. To process and/or classify IMSI and/or packet(s) information associated with a mobile device, a conventional approach is to establish a data structure to store various classification rules in connection to IMSIs and/or packet addresses whereby communication between a mobile and its destination, for example, can be processed quickly using the data stored in the data structure.

For example, IMSI related information, policies, and/or rules may be stored in the data structure or a lookup table. Information stored in the data structure is typically searchable. The IMSI associated with a mobile is classified and/or process based on lookup results obtained from the data structure. A problem associated with the conventional approach of storing such IMSI related classification rules, for instance, is consumption of large amount of memory space. For example, to store classification rules containing a wildcard which covers a range of addresses, memory space required to store such wildcard prefix or suffix can increase exponentially.

SUMMARY

A method and apparatus for network accessing configured to prefix filtering one or more wildcard identity relating to International Mobile Subscriber Identity ("IMSI") applications are introduced. Upon receiving a request of a new rule with system identification ("SID") for network access, a process of wildcard prefixing is able to identify a wildcard in a predefined field of the SID and determine a specific prefix value associated with the field of the SID. The SID, in one example, may be an IMSI. After retrieving the specific prefix in accordance with the wildcard, the wildcard in the SID is replaced with the specific prefix to form a modified rule. The predefined field of the SID can be a field for mobile country code ("MCC"), mobile network code ("MNC"), or mobile subscriber identification number ("MSIN"). The modified rule(s) are subsequently inserted into a data structure.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
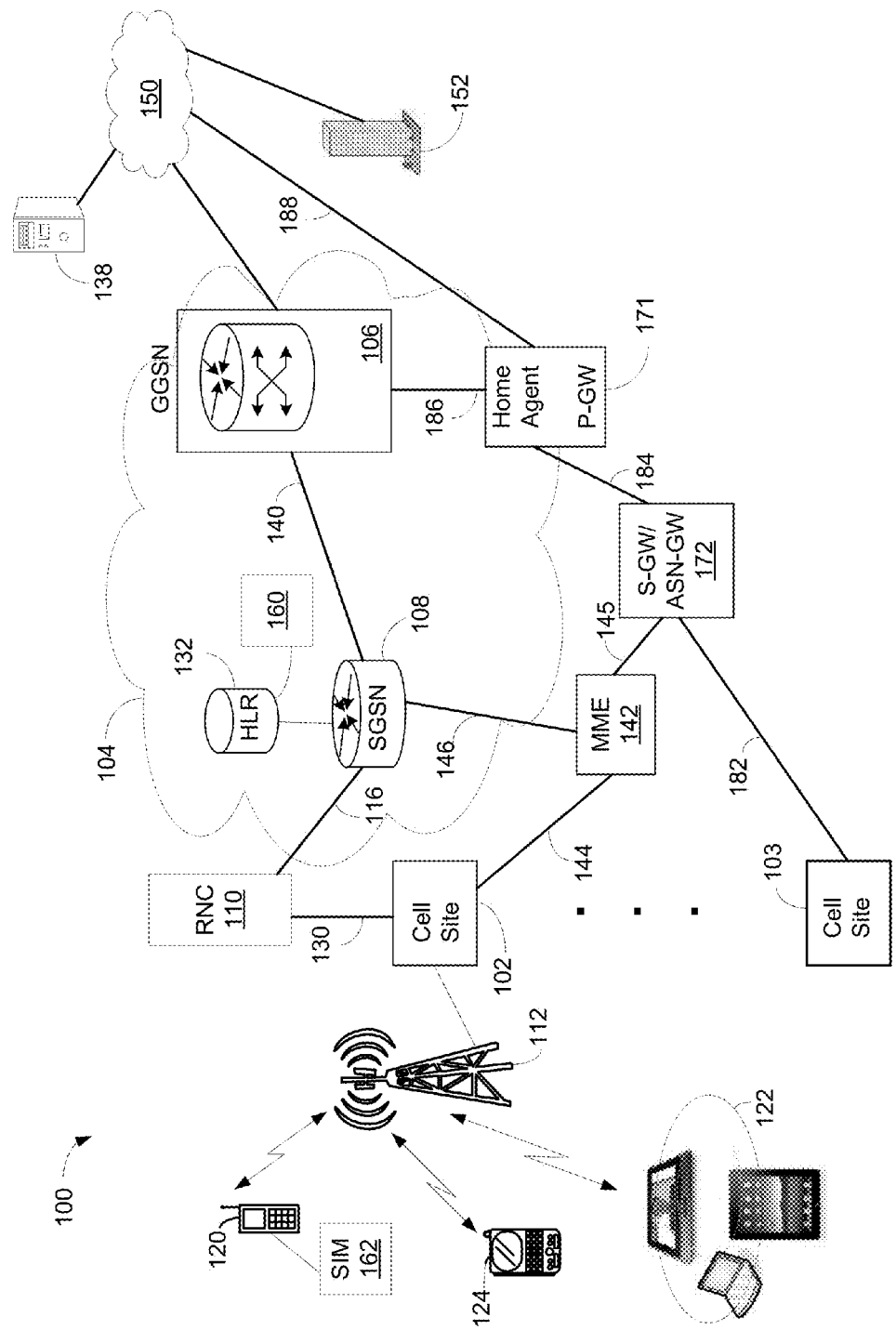
FIG. 1 is a block diagram illustrating a network configuration having one or more network devices configured to prefix wildcard in IMSI to enhance and manage network access in accordance with one embodiment of the present invention in accordance with one embodiment of the present invention.

Exemplary embodiment(s) of the present invention is described herein in the context of a method, device, and apparatus of employing a prefixing wildcard International Mobile Subscriber Identity ("PWI") to enhance authentication process for network access by mobile devices.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

An embodiment of present invention discloses a method and/or apparatus capable of prefixing or replacing at least one wildcard in a field of International Mobile Subscriber Identity ("IMSI") with a specific value or prefix. In one aspect, upon receiving a request of a new rule with system identification ("SID") such as an IMSI for network access, a process is able to identify a wildcard in a predefined field of the SID. The SID, in one example, may be an IMSI. After retrieving a specific prefix in accordance with the identified wildcard, the wildcard is prefixed or replaced by the specific prefix to form a modified rule. The predefined field of the SID can be a field for mobile country code ("MCC"), mobile network code ("MNC"), or mobile subscriber identification number ("MSIN"). The modified rule is subsequently inserted into a memory structure.

FIG. 1 is a block diagram 100 illustrating a network configuration having one or more network devices using PWI to enhance and manage network access in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172, and packet data network gateway ("P-GW") or HomeAgent 171. Node 106 is also coupled to Internet, wide area network ("WAN"), or virtual private network ("VPN") 150. Internet, WAN, or VPN provides network communication between node 106 and network devices such as server 138 and service provider(s) or subscription partner 152. Subscription or service provider 152, in one aspect, is a wireless carrier responsible for monitoring and managing user subscriptions. Server 138 may be a remote network server capable of providing network policy and/or IMSI rules. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), fourth generation ("4G"), LTE (long term evolution), or combination of 3G and 4G cellular network configuration. MME 142, in one aspect, is coupled to cell site 102 and S-GW 172 via connections 144-145 and facilitates data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and is capable of routing data packets from cell site 103 (eNodeB) or MME 142 or P-GW 171 via connections 145 and 184. Note that S-GW 172 can couple to additional network elements such as additional MMEs and/or base stations. In an evolved packet core ("EPC") network environment, S-GW 172 can also be used to perform an anchoring function for mobility between 3G and 4G equipments. S-GW 172, in one aspect, performs various network management functions, such as authenticating device identity, terminating paths, paging idling UEs, storing data, routing information, generating replica, and the like.

P-GW 171, which is also known as HomeAgent, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, or PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Switching network 104 may be referred to as packet core network and cell sites 102-103 may be referred to as radio access networks. It should be noted that a different network architecture or configuration may be implemented for 3G, 4G, or 5G cellular networks with different layout of network elements, and/or differently named network elements, but the underlying concept of exemplary embodiment would not change. Switching network 104, in one aspect, includes IP and/or Multi Protocol Label Switching ("MPLS") based network capable of operating at a layer of Open Systems Interconnection Basic Reference Model ("OSI model") for information transfer between clients and network servers. Referring back to FIG. 1, network 104, including network nodes 106-108, a home location register ("HLR") 132, is able to route packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130.

Node 106 is a gateway GPRS support node ("GGSN") wherein GPRS is a general packet radio service. GGSN 106 includes one or more routers or switches capable of managing, monitoring, and routing network traffic or network flows between sources and destinations. Network flow or packet flow, in one example, is a network access initiated by a subscriber and/or a user. Network node or GGSN 106, hereinafter referred to as GGSN, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or hub.

Node 108 is a serving GPRS support node ("SGSN") configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, SGSN 108 is connected to MME 142 which is also able to route packet streams to/from LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone®, BlackBerry®, Android®, and so on. In one aspect, handheld devices 120-124 store their IMSIs in their SIM cards such as SIM 162. Cell site 102 facilitates network communication between mobile devices such as handheld device 124 and iPad® 122 via radio tower 112. It should be noted that cell site 102 may include additional radio towers as well as other land switching circuitry.

Referring back to FIG. 1, HLR 132, in one embodiment, includes a PWI 160 which allows network operators to configure IMSI-Prefix/MCC/MNC based policies or based rules to handle wildcard field(s) more efficiently. Even though additional lookup steps or activities may be required to implement PWI 160, the amount of memory space saved is substantial. IMSI-Prefix/MCC/MNC based rules, for example, can be defined as rules relating to authenticate IMSIs regarding whether an Internet Protocol Connectivity Access Network ("IPCAN") session across a packet data network ("PDN") should be established. IMSI-Prefix/MCC/MNC based rules or policies, such as black-listing and/or split-apn-policies, are stored in a searchable data structure whereby each IMSI can be quickly processed and classified based on stored rules.

When PWI 160 identifies a rule based on a match between an IMSI and one of configured IMSI-Prefix/MCC/MNC based rules, a specific action such as discard access request is performed in accordance with the identified rule. For instance, in case of blacklisting a mobile device, the action is to disallow an IPCAN Session/PDN connection to be established. If no link or IPCAN session is established associated with the IMSI, the mobile associated with the IMSI cannot access the network. Alternatively, if an IMSI matches with a rule of split-apn-policy, a real APN (access point name) from a group of virtual APNs is selected for the mobile or network device. Note that the real APN will be used as policy attachment point.

In operation, when cellular phone 120, for example, is blacklisted because of termination of mobile service, SGSN 108 will disallow network connection or IPCAN session(s) for phone 120 in view of IMSI information stored in SIM (subscriber identification module) 162. Upon receipt of IMSI from SIM 162 of phone 120, PWI 160 looks up a data structure or a lookup table containing IMSI based rules or policies using the IMSI as an index or key. If a match of blacklist is found in IMSI based rules, a network connection between phone 120 and the rest of network is blocked by SGSN 108. It should be noted the PWI 160 can reside at other devices other than HLR 132. For example, PWI 160 can also reside at SGSN 108, MME 142, SGW 172, or the like.

An advantage of employing PWI 160 is to dramatically reduce storage requirement with minimal impact on lookup performance. It should be noted that while impacting in lookup performance may be in a linear order, reduction in storage space should be in exponential order.

Figure 2:
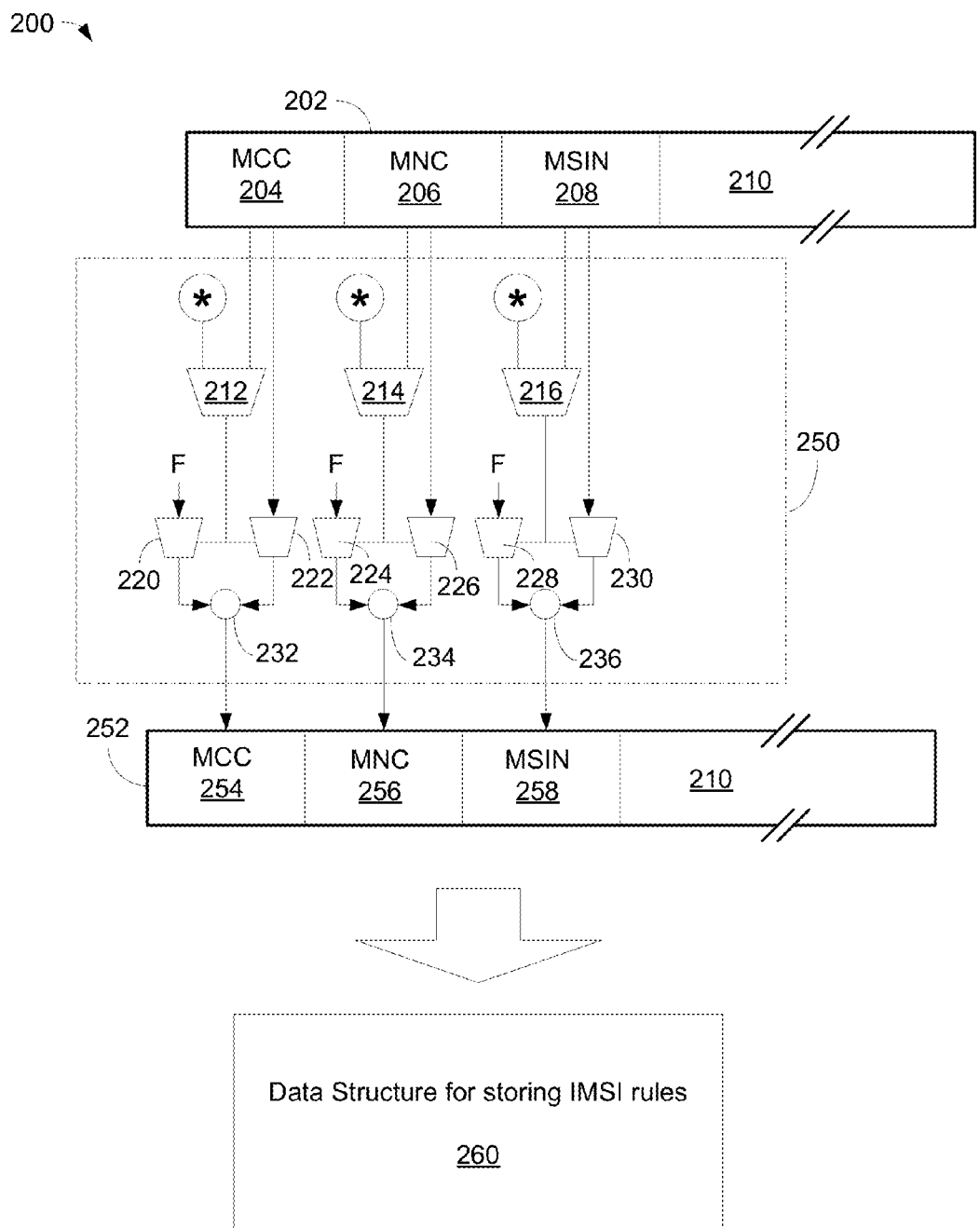
FIG. 2 is a logic diagram illustrating a process of rule modification for prefixing wildcards in an IMSI application in accordance with one embodiment of the present invention.

FIG. 2 is a logic diagram 200 illustrating a process of rule modification for prefixing wildcards in an IMSI application in accordance with one embodiment of the present invention. Diagram 200 includes a rule 202, a modified rule 252, a wildcard prefixer 250, and a data structure 260. Rule 202 includes a MCC field 204, a MNC field 206, a MSIN field 208, and a reserved filed 210, wherein reserved filed 210 may include security information as well as protocol setting(s). Modified rule 252 also includes a MCC field 254, a MNC field 256, a MSIN field 258, and a reserved filed 210. It should be noted that the underlying concept of the exemplary embodiment(s) of the present invention would not change if one or more blocks (or devices) were added to or removed from diagram 200.

In one aspect, wildcard prefixer 250 performs IMSI wildcard filtering to generate modified rule 252 based on original rule 202. A wildcard in an address field or ID field, represented by a symbol "*", indicates a range of addresses or IDs. For example, a wildcard "*" in a four (4) bit field indicates a range of sixteen (16) different addresses or IDs and it can be expanded into sixteen (16) independent addresses.

Modified rule 252, also referred to as a special rule, is subsequently inserted into a data structure or a searchable tree-like lookup table such as a Patricia tree. For example, when a MNC match rule is to be inserted into the data structure, instead of performing a normal insertion, the MNC match rule may be modified if the rule contains wildcard(s). The modified rule(s), after its wildcard is replaced by a predefined specific prefix or value, is inserted into the data structure. For example, the modification is to prefix the MNC match rule by replacing value of MNC field of IMSI with a reserved MCC value such as a value of "FF".

An advantage of using a PWI to removing wildcard is to conserve storage space with acceptable increasing in lookup steps. To properly execute or modify network accessing rules or IMSI rules, the number of lookups to identify relevant rule(s) is increased accordingly. For example, with one wildcard replacement in an IMSI rule, the number of lookups increases from one (1) lookup to two (2) lookups. For two wildcards replacement in a rule, the number of lookups increases from one (1) lookup to four (4) lookups. For example, for one (1) wildcard replacement, the first lookup is performed as a normal IMSI retrieved from PDP/Bearer parameters, and the second lookup is performed with modified IMSI which is prefixed with a reserved value of "FFF".

To modify rule or IMSI rule 202, a comparator 212 compares a predefined wildcard (*) with MCC field 204 to determine whether MCC field 204 is a wildcard. If a match between wildcard (*) and MCC field 204 is found, gate 220 is selected and specific prefix "F" is gated into MCC field 254 of modified rule 252. If a match between wildcard (*) and MCC field 204 is not found, gate 222 is selected and the value in MCC field 204 is gated into MCC field 254 of modified rule 252. A comparator 214 compares wildcard (*) with MNC field 206 to determine whether MNC field 206 is a wildcard. If a match between wildcard (*) and MNC field 206 is found, gate 224 is selected and specific prefix "F" is gated into MNC field 256 of modified rule 252. If a match between wildcard (*) and MNC field 206 is not found, gate 226 is selected and value in MNC field 206 is gated into MNC field 256 of modified rule 252. Also, a comparator 216 compares wildcard (*) with MSIN field 208 to determine whether MSIN field 208 is a wildcard. If a match between wildcard (*) and MSIN field 208 is found, gate 228 is selected and specific prefix "F" is gated into MSIN field 258 of modified rule 252. If a match between wildcard (*) and MSIN field 208 is not found, gate 230 is selected and value in MSIN field 208 is gated into MSIN field 258 of modified rule 252.

It should be noted that additional fields maybe examined to determine whether wildcard(s) should be replaced. Depending on the applications, number of wildcards in each rule may be limited to optimize overall network performance. After modified rules 252 is created, it is stored in data structure 260. Note that data structure 260, in one embodiment, is a searchable tree-like database, such as a Patricia tree, prefix tree, or radix tree storage database. Note that level and path compressed trees such as Patricia trees can be used for storing IMSI-Prefix/MCC/MNC filtering rules.

Figure 3:
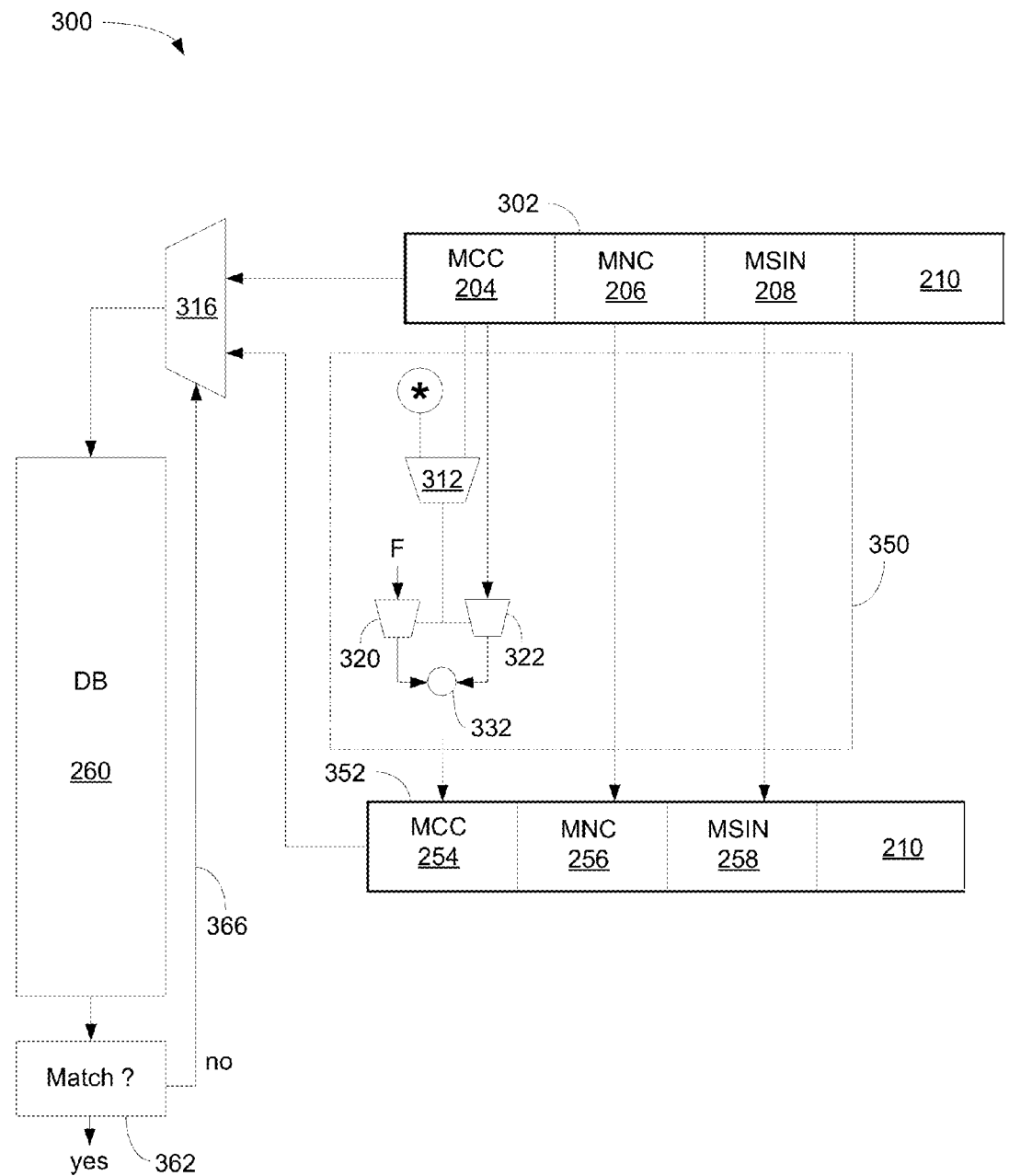
FIG. 3 is a logic diagram illustrating a lookup process using prefixing wildcard IMSI ("PWI") in accordance with one embodiment of the present invention.

FIG. 3 is a logic diagram 300 illustrating a lookup process using PWI in accordance with one embodiment of the present invention. Diagram 300 includes an IMSI key 302, a modified IMSI key 352, a key wildcard prefixer 350, and data structure or database 260. IMSI key 302, similar to rule 202, includes MCC field 204, MNC field 206, MSIN field 208, and reserved filed 210, wherein reserved filed 210 may include security information as well as protocol setting(s). Modified IMSI key 352 includes MCC field 254, MNC field 256, MSIN field 258, and reserved filed 210. Note that diagram 300 shows IMSI key 302 contains one (1) wildcard in the field of MCC 204. It should be noted that the underlying concept of the exemplary embodiment(s) of the present invention would not change if one or more blocks (or devices) were added to or removed from diagram 300.

In operation, upon receipt of IMSI key 302, a comparator 312 compares wildcard (*) with MCC field 204 of IMSI key 302 to determine whether MCC field 204 is a wildcard. If a match between wildcard (*) and MCC field 204 is found, gate 320 is selected and specific prefix "F" is gated into MCC field 254 of modified IMSI key 352. If a match between wildcard (*) and MCC field 204 is not found, gate 322 is selected and value in MCC field 204 is gated into MCC field 254 of modified IMSI key 352. During first lookup process, mux 316 gates IMSI key 302 to data structure 260 for performing a first lookup to determine whether a match can be found between IMSI key 302 and rules in data structure 260. If a match is identified between IMSI key 302 and a rule in data structure 260, the lookup process concludes at block 362 and the rule(s) is identified. If IMSI key 302 is failed to match any rules in data structure 260, block 362 selects modified IMSI key 352 at mux 316 via control signal 366. Mux 316 gates modified IMSI key 352 to data structure 260 to perform a second lookup to determine whether a match can be found between modified IMSI key 352 and rules in data structure 260. If a match is identified, second lookup process concludes and the rule is obtained. It should be noted that depending on the rule or rules, the mobile associated with IMSI may or may not be allowed to access the network.

Figure 4:
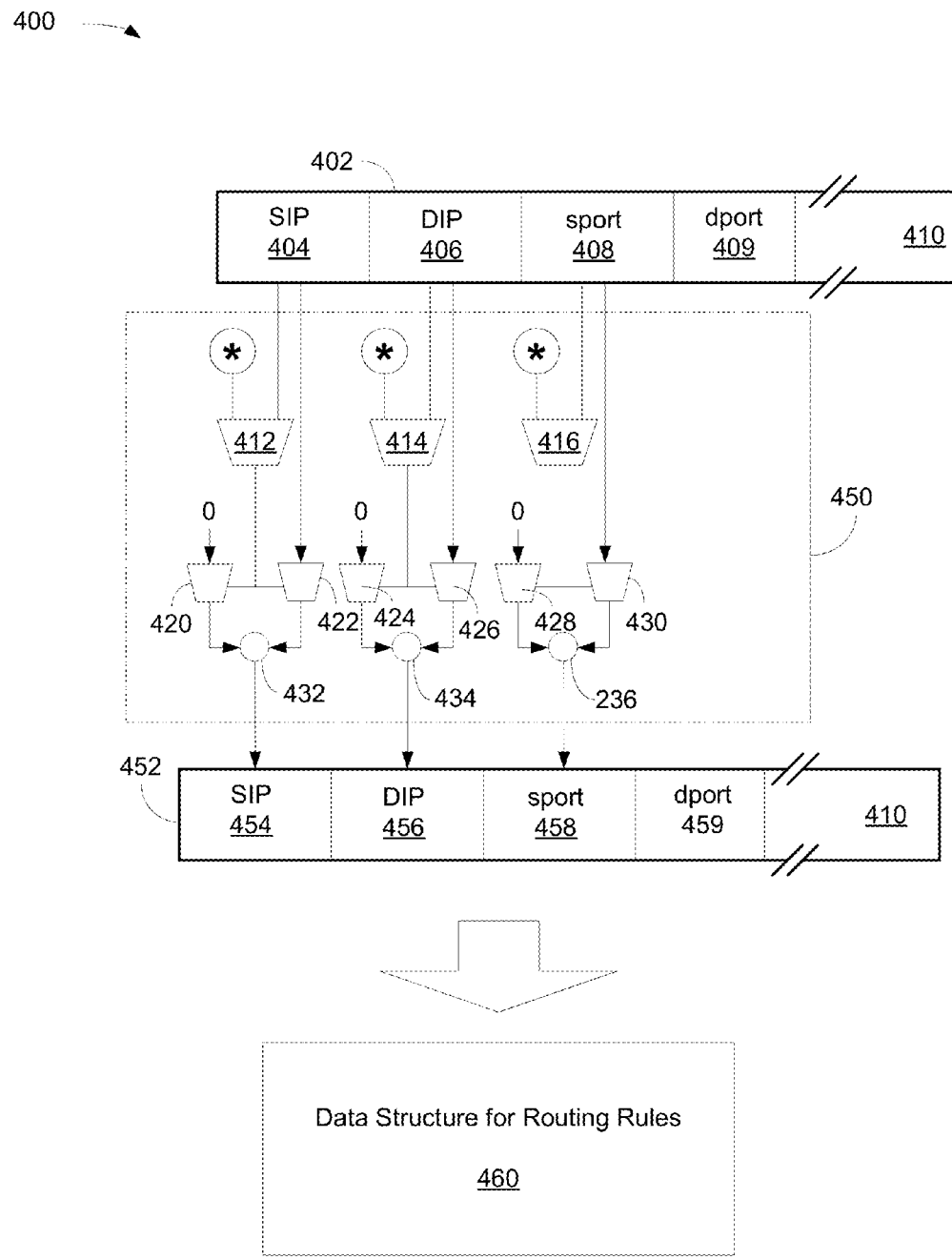
FIG. 4 is a logic diagram illustrating a rule modification process for prefixing wildcards in a packet routing application in accordance with one embodiment of the present invention.

FIG. 4 is a logic diagram 400 illustrating a rule modification process for prefixing wildcards in a packet routing application in accordance with one embodiment of the present invention. Diagram 400 includes a rule 402, a modified rule 452, a wildcard prefixer 450, and a data structure 460. Rule 402 includes a source IP ("SIP") field 404, a destination IP ("DIP") field 406, a source port ("sport") field 408, a destination port ("dport") field 409, and a reserved filed 410. Modified rule 452 includes a SIP field 454, a DIP field 456, a sport field 458, a dport field 459, and a reserved filed 410. It should be noted that the underlying concept of the exemplary embodiment(s) of the present invention would not change if one or more blocks (or devices) were added to or removed from diagram 400.

Similar to FIG. 2, wildcard prefixer 450 performs packet filtering by removing wildcard(s) to generate modified rule 452 based on original rule 402. Modified rule 452, also referred to as special rule, is subsequently inserted into a data structure or a searchable tree-like lookup table such as a Patricia tree. When a SIP match rule is to be inserted into the data structure, instead of performing a normal insertion, the SIP match rule is modified if the rule contains wildcard(s). The modified rule(s), after its wildcard is replaced by a predefined specific prefix or value, is inserted into the data structure. For example, the modification is to prefix the SIP match rule with a specific value of "0". Note that a SIP match rule, in one example, is a rule having a specific value such as "0" in its SIP field.

To generate a modified rule or modified routing rule, a comparator 412 compares wildcard (*) with SIP field 404 to determine whether SIP field 404 is a wildcard. If a match between wildcard (*) and SIP field 404 is found, gate 420 is selected and specific prefix "0" is gated into SIP field 454 of modified rule 452. If a match between wildcard (*) and SIP field 404 is not found, gate 422 is selected and value in SIP field 404 is gated into SIP field 454 of modified rule 452. A comparator 414 compares wildcard (*) with DIP field 406 to determine whether DIP field 406 is a wildcard. If a match between wildcard (*) and DIP field 406 is found, gate 424 is selected and specific prefix "0" is gated into DIP field 456 of modified rule 452. If a match between wildcard (*) and DIP field 406 is not found, gate 426 is selected and value in DIP field 406 is gated into DIP field 456 of modified rule 452. Also, a comparator 416 compares wildcard (*) with sport field 408 to determine whether sport field 408 is a wildcard. If a match between wildcard (*) and sport field 408 is found, gate 428 is selected and specific prefix "0" is gated into sport field 458 of modified rule 452. If a match between wildcard (*) and value in sport field 408 is not found, gate 430 is selected and value in sport field 408 is gated into sport field 458 of modified rule 452. It should be noted that additional fields maybe examined to determine whether wildcard(s) should be replaced. After modified rules 452 is created, it is stored in data structure 460.

Figure 5:
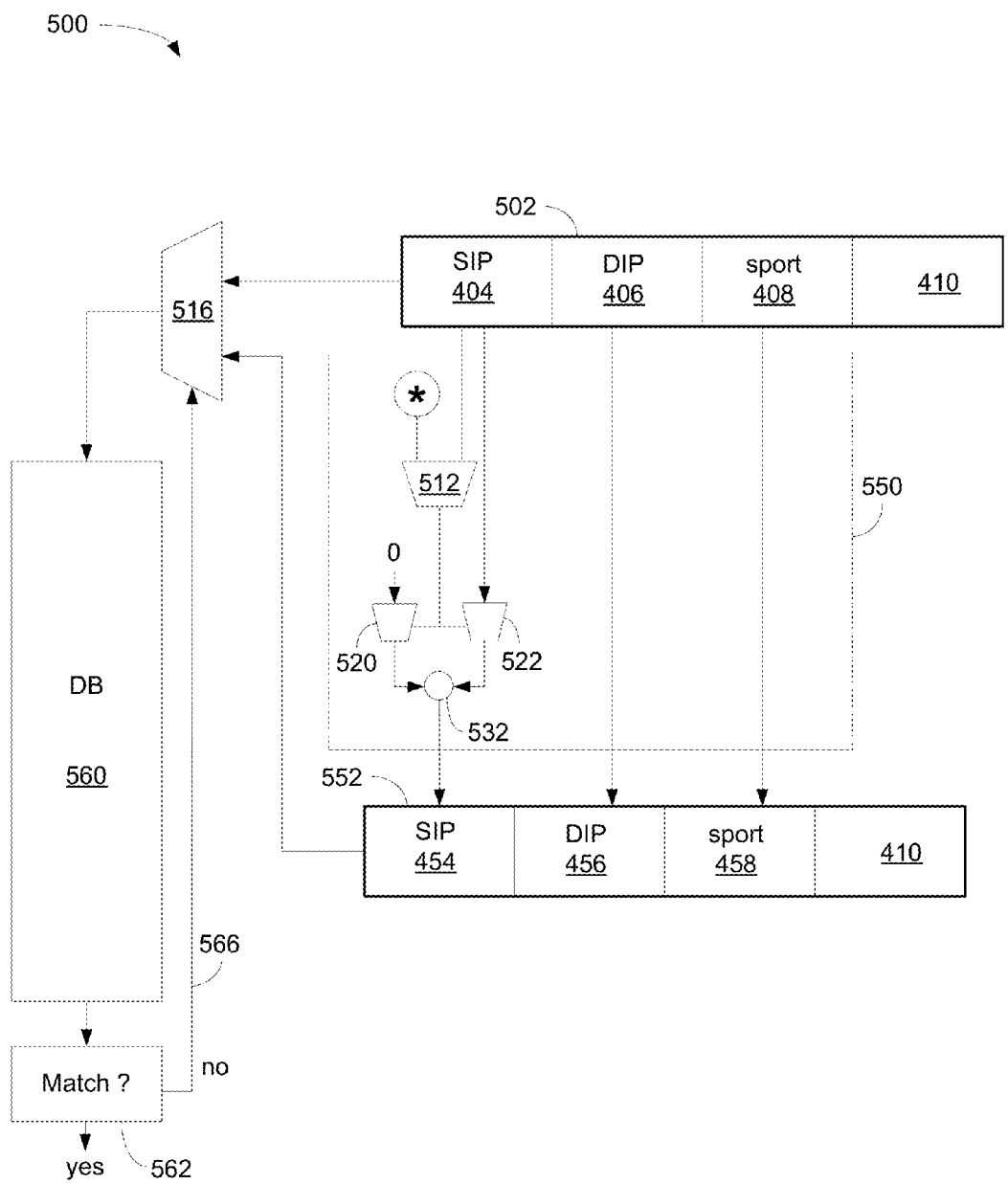
FIG. 5 is a logic diagram illustrating a lookup process using prefixing wildcard(s) in a packet routing application in accordance with one embodiment of the present invention.

FIG. 5 is a logic diagram 500 illustrating a lookup process using prefixing wildcard(s) in a packet routing application in accordance with one embodiment of the present invention. Diagram 500 includes a key 502, a modified key 552, a key wildcard prefixer 550, and data structure or database 560. Key 502, similar to rule 402, includes SIP field 404, DIP field 406, sport field 408, and a reserved filed 410. Modified rule 552 also includes a SIP field 454, a DIP field 456, a sport field 458, and a reserved filed 410. Note that diagram 500 shows key 502 contains one (1) wildcard in the field of SIP 404. It should be noted that the underlying concept of the exemplary embodiment(s) of the present invention would not change if one or more blocks (or devices) were added to or removed from diagram 500.

In one operation, upon receipt of key 502, a comparator 512 compares wildcard (*) with SIP field 404 of key 502 to determine whether SIP field 504 is a wildcard. If a match between wildcard (*) and SIP field 504 is found, gate 520 is selected and specific prefix "0" is gated into SIP field 454 of modified key 552. If a match between wildcard (*) and SIP field 504 is not found, gate 522 is selected and the value in SIP field 504 is gated into SIP field 554 of modified key 552. During a first lookup process, mux 516 gates key 502 to data structure 560 to perform a lookup to determine whether a match can be found between key 502 and rules in data structure 560. If a match is identified between key 502 and a rule in data structure 560, the lookup process ends at block 562 and the rule(s) is identified. If a match is failed, block 562 selects modified key 552 at mux 516 via control signal 566. To perform a second lookup process, mux 316 gates modified key 552 to data structure 560 to perform a lookup to determine whether a match can be found between modified key 552 and rules in data structure 260. If a match is identified, second lookup process ends and the rule is obtained. It should be noted that depending on the rule or rules, the network system or mobile device may or may not be allowed to access the network.

In a following exemplary operation, the modified rules shown in Table 2 are generated based on the original rules shown in Table 1, shown below.

TABLE 1

| Original rules | | | | |
|---|---|---|---|---|
| SIP | DIP | Protocol | Sport | dport |
| 10.10.10.0/24 | 20.20.0.0/24 | TCP | * | * |
| 10.10.0.9/16 | * | TCP | * | * |
| * | 20.20.0.0/16 | TCP | * | * |
| * | * | TCP | * | * |

TABLE 2

| Modified rules ↓ rule modification | | | | |
|---|---|---|---|---|
| SIP | DIP | Protocol | Sport | dport |
| 10.10.10.0/24 | 20.20.0.0/24 | TCP | * | * |
| 10.10.0.9/16 | 0/32 | TCP | * | * |
| 0/32 | 20.20.0.0/16 | TCP | * | * |
| 0/32 | 0/32 | TCP | * | * |

Note that value "0/32" is not a valid value for SIP and DIP field of a rule. When the SIP field equals to a wildcard (*), a rule will match any key with any value in SIP field. Any modified rule replacing wildcard (*) with value "0/32" (i.e., SIP=*=>SIP=0/32) will also match any modified key replacing wildcard (*) with value "0/32" (i.e., SIP=*=>SIP=0/32) since both rule and key have the same value such as "0/32". Note that DIP field operates similar to SIP field.

If both SIP and DIP fields contain "0/32," four (4) lookups, in one embodiment, are implemented, wherein lookup 1 (L1) produces result 1 (R1), lookup 2 (L2) produces result 2 (R2), lookup 3 (L3) produces result 3 (R3), and lookup 4 (L4) generates result 4 (R4) via lookup processes. The final result is the lowest rule numbers such as R1, R2, R3, and/or R4.

During an operation, L1 tries to match against all rules except those rules where SIP field equals to wildcard "*" and/or DIP field equals to wildcard "*". Note that SIP and DIP fields have been modified to SIP=0/32 and/or DIP=0/32. L2 tries to match against all rules where SIP field has a wildcard "*" which has been modified to SIP=0/32. L3 tries to match against all rules where DIP field has a wildcard "*" which has been modified to DIP=0/32. L4 tries to match against all rules where SIP field has a wildcard "*" and DIP field has a wildcard "*" which have been modified to SIP=0/32 and DIP=0/32.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
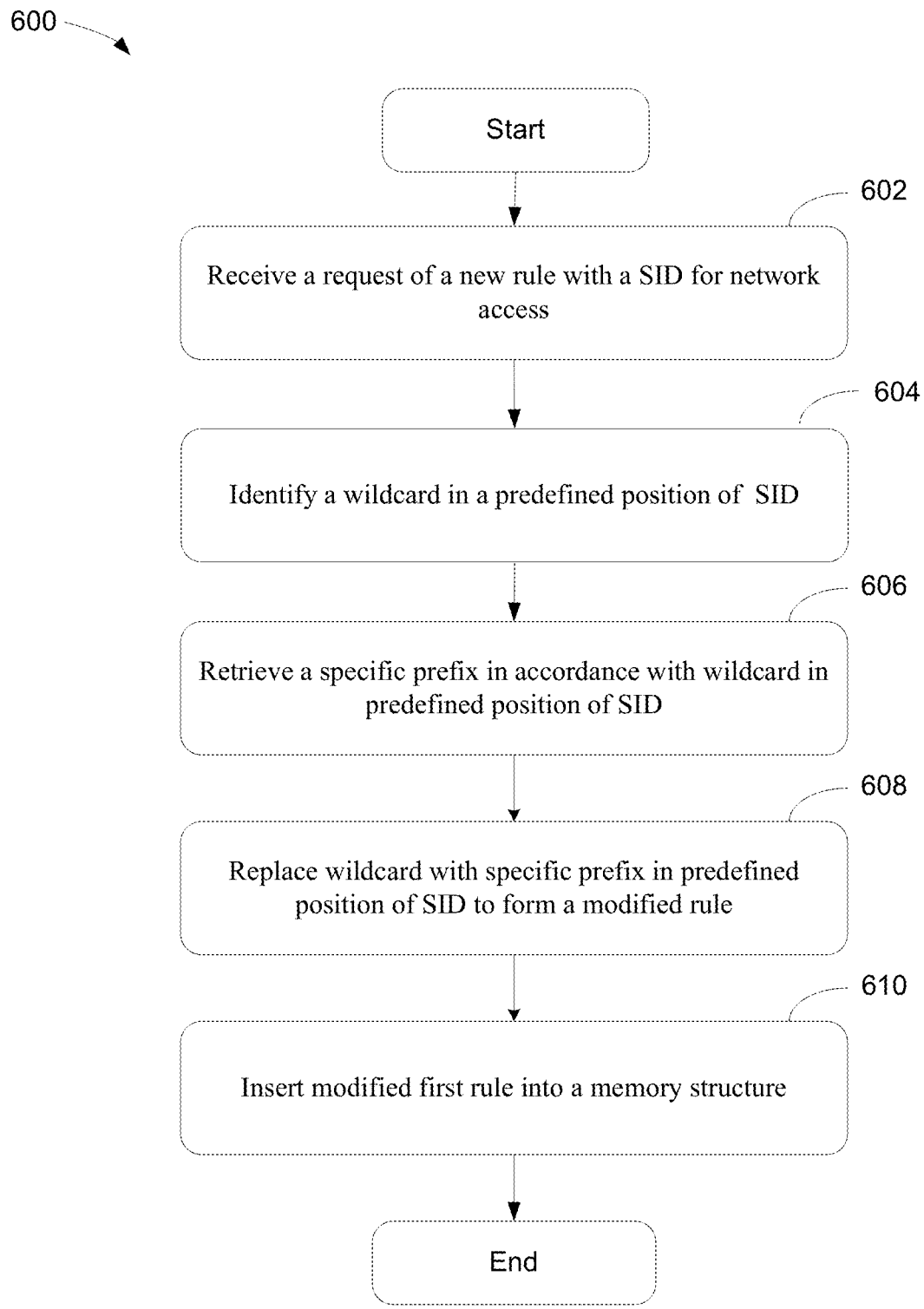
FIG. 6 is a flowchart illustrating an exemplary process of prefixing wildcard(s) to enhance network access using PWI in accordance with one embodiment of the present invention.

FIG. 6 is a flowchart 600 illustrating an exemplary process of prefixing wildcard(s) to enhance network access using PWI in accordance with one embodiment of the present invention. At block 602, a process of managing network access is capable receiving a request of a new rule with system identification ("SID") for network access. SID, in one example, is an IMSI. In one example, a new rule or obtaining a policy for blacklisting regarding a mobile device associated with the IMSI.

At block 604, the process identifies a first wildcard in a first predefined field of the SID. The first predefined field may be MCC field, MNC field, and/or MSIN field of IMSI. In one aspect, the process is able to determine a wildcard symbol in MNC field or MCC field of IMSI.

At block 606, a first specific prefix in accordance with the first wildcard in the first predefined field of the SID is retrieved. The first specific prefix, in one example, is a specific value such as "FF" or "00". The predefined field of the SID also includes, but not limited to, MCC field of IMSI, MSIN field of IMSI, SIP field of packet address, DIP field of packet address, sport field of packet address, or dport field of packet address.

At block 608, the process replaces the first wildcard with the first specific prefix in the first predefined field of the SID to form a first modified rule.

At block 610, the first modified rule is inserted into a memory structure. For example, the modified rule of split access port name ("APN") policy is stored in a lookup table organized in a searchable tree configuration. Upon receiving a first lookup key having a key address, a first key wildcard is identified in a first predefined field of the key address. The first key wildcard is subsequently replaced with the first specific prefix to form a first modified key. In one embodiment, after performing a first lookup to match the first lookup key with data stored in the memory structure, the process is able to perform a second lookup to match the first modified key with the data stored in the memory structure. After identifying a second wildcard in a second predefined field of the SID, the process retrieves a second specific prefix in accordance with the second wildcard and replaces the second wildcard with the second specific prefix. After identifying a second key wildcard in a second predefined field of the key address, the second key wildcard is also replaced with the second specific prefix to form a second modified key. Upon performing a third lookup to match the second modified key with the data or addresses stored in the memory structure, the process is capable of replacing the first key wildcard with the first specific prefix and replacing the second wildcard with the second specific prefix to form a third modified key. A fourth lookup is performed to match the third modified key with data stored in the memory structure.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for network accessing, comprising:
   receiving a request of a new rule with a system identification ("SID") for network access;
   identifying a first wildcard in a first predefined field of the SID;
   retrieving a first specific prefix in accordance with the first wildcard in the first predefined field of the SID;
   replacing the first wildcard with the first specific prefix in the first predefined field of the SID to form a modified first rule; and
   inserting the modified first rule into a memory structure;
   performing a first lookup to match a first lookup key with information stored in the memory structure; and
   performing a second lookup to match a first modified key with the information stored in the memory structure.

2. The method of claim 1, further comprising:
   receiving the first lookup key having a key address identifying the SID; and
   identifying a first key wildcard in a first predefined field of the key address.

3. The method of claim 2, further comprising replacing the first key wildcard with the first specific prefix to form the first modified key.

4. The method of claim 1, further comprising:
   identifying a second wildcard in a second predefined field of the SID;
   retrieving a second specific prefix in accordance with the second wildcard in the second predefined field of the SID;
   replacing the first key wildcard with the first specific prefix and replacing the second wildcard with the second specific prefix to form a third modified key; and
   replacing the second wildcard with the second specific prefix in the second predefined field of the SID.

5. The method of claim 4, further comprising:
   identifying a second key wildcard in a second predefined field of the key address; and
   replacing the second key wildcard with the second specific prefix to form a second modified key.

6. The method of claim 5, further comprising:
   performing a third lookup to match the second modified key with the information stored in the memory structure; and
   performing a fourth lookup to match the third modified key with data stored in the memory structure.

7. The method of claim 1, wherein receiving a request of a new rule with a SID for packet processing includes obtaining a policy of blacklist in connect to an International Mobile Subscriber Identity ("IMSI").

8. The method of claim 7, wherein identifying a first wildcard in a first predefined field of the SID includes determining a wildcard symbol representing a range of addresses in a field of Mobile Network Code ("MNC") of IMSI.

9. The method of claim 8, wherein inserting the modified first rule into a memory structure includes storing the modified rule of split access port name ("APN") policy in a lookup table organized in a searchable tree configuration.

10. A method for managing network access, comprising:
    receiving a new rule having a routing address to be added to a memory structure for network access management;
    identifying a first wildcard in a source Internet Protocol ("SIP") location of the routing address;
    retrieving a first specific prefix in accordance with the first wildcard;
    replacing the first wildcard with the first specific prefix in the SIP location of the routing address to form a first modified rule; and
    inserting the first modified rule into a memory structure;
    performing a first lookup to match a first key with data stored in the memory structure; and
    performing a second lookup to match a first modified key with the data stored in the memory structure.

11. The method of claim 10, further comprising:
    receiving the first key having a key address identifying the routing address;
    identifying a first key wildcard in a SIP location of the key address; and replacing the first key wildcard with the first specific prefix to form the first modified key.

12. The method of claim 10, further comprising:
    identifying a second wildcard in a destination IP ("DIP") location of the routing address;
    retrieving a second specific prefix in accordance with the second wildcard;
    replacing the second wildcard with the second specific prefix in the DIP location of the routing address; and
    replacing the first key wildcard with the first specific prefix and replacing the second wildcard with the second specific prefix to form a third modified key.

13. The method of claim 12, further comprising:
identifying a second key wildcard in a DIP location of the key address; and
replacing the second key wildcard with the second specific prefix to form a second modified key.

14. The method of claim 13, further comprising:
performing a third lookup to match the second modified key with the data stored in the memory structure; and
performing a fourth lookup to match the third modified key with the data stored in the memory structure.

15. The method of claim 10, wherein receiving a new rule includes receiving a blacklist in connect to an Internal Mobile Subscriber Identity ("IMSI").

16. A method of prefix filtering for managing network access, comprising:
receiving a lookup key having a key address and identifying a first key wildcard in a Mobile Network Code ("MNC") field of an International Mobile Subscriber Identity ("IMSI") of the key address;
replacing the first key wildcard with the first specific prefix to form a first modified key;
performing a first lookup to match the lookup key with data stored in a memory structure; and
performing a second lookup to match the first modified key with the data stored in the memory structure;
receiving a new rule having a SID for packet filtering;
identifying a first wildcard in the MNC field of the SID and replacing the first wildcard with a specific prefix to form a first modified rule;
identifying a second wildcard in the MNC field of the SID and replacing the second wildcard with a specific prefix to form a second modified rule;
replacing the first wildcard in the MNC with the specific prefix and the second wildcard in the MNC to form a third modified rule; and
inserting the first, second, and third modified rules into the memory structure.

17. The method of claim 16, further comprising:
identifying a second key wildcard in a Mobile Subscriber Identification Number ("MSIN") field of the key address;
replacing the second key wildcard with the first specific prefix to form a second modified key;
performing a third lookup to match the second modified key with data stored in a memory structure;
replacing the first key wildcard with the first specific prefix and replacing the second wildcard with the second specific prefix to form a third modified key; and
performing a fourth lookup to match the third modified key with the data stored in the memory structure.

* * * * *